US008930476B2

(12) United States Patent
Luo et al.

(10) Patent No.: US 8,930,476 B2
(45) Date of Patent: Jan. 6, 2015

(54) INSTANT MESSAGING (IM) FILE FOLDER TRANSMISSION METHOD AND SYSTEM

(75) Inventors: Xuecheng Luo, Shenzhen (CN); Pu Wang, Shenzhen (CN); Jiajun Chen, Shenzhen (CN); Xingjian Qi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 407 days.

(21) Appl. No.: 13/448,387

(22) Filed: Apr. 16, 2012

(65) Prior Publication Data

US 2012/0203850 A1 Aug. 9, 2012

Related U.S. Application Data (63) Continuation of application No. PCT/CN2010/080070, filed on Dec. 21, 2010.

(51) Int. Cl.
*G06F 13/00* (2006.01)
*H04L 12/58* (2006.01)

(52) U.S. Cl.
CPC ............... *H04L 51/04* (2013.01); *H04L 51/08* (2013.01)
USPC ........................................................ 709/206

(58) Field of Classification Search
CPC ... H04L 12/58; H04L 12/581; H04L 12/5855; H04L 12/585; H04L 51/04; H04L 51/08; G06Q 10/107
USPC ........................................................ 709/206
See application file for complete search history.

(56) References Cited

U.S. PATENT DOCUMENTS

2008/0033902 A1 2/2008 Glaizel et al.

FOREIGN PATENT DOCUMENTS

| CN | 1609858 A | 4/2005 |
| CN | 101098310 A | 1/2008 |
| CN | 101547161 A | 9/2009 |
| WO | WO 2009/121057 A2 * | 10/2009 .............. G06F 17/30 |

OTHER PUBLICATIONS

International Search Report in Chinese and English Translation dated Mar. 31, 2011 (setting forth relevance of cited foreign documents).

* cited by examiner

*Primary Examiner* — Robert B Harrell
(74) *Attorney, Agent, or Firm* — Anova Law Group, PLLC (57) ABSTRACT

A method is disclosed for folder transfer based on instant messaging (IM). The method includes receiving from an IM sender a transfer request for transferring a folder-to-be-transferred. The folder-to-be-transferred may contain a plurality of files. The method also includes receiving from the IM sender folder information of the folder-to-be-transferred, determining a receiving folder corresponding to the folder-to-be-transferred on a predetermined storage location, and determining files-to-be-transferred from the plurality of files corresponding to the folder-to-be-transferred based on the folder information. Further, the method includes sequentially sending one transfer request for each of the files-to-be-transferred to the IM sender through a same network connection, receiving the files-to-be-transferred sent sequentially by the IM sender through the same network connection, and storing the received files-to-be-transferred in the receiving folder.

17 Claims, 4 Drawing Sheets

INSTANT MESSAGING (IM) FILE FOLDER TRANSMISSION METHOD AND SYSTEM

CROSS-REFERENCES TO RELATED APPLICATIONS

This application claims the priority of PCT application no. PCT/CN2010/080070, filed on Dec. 21, 2010, which claims the priority of Chinese patent application no. 201010105572.8, filed on Jan. 21, 2010, the entire contents of all of which are incorporated herein by reference.

FIELD OF THE INVENTION

The present invention relates to the field of communication technology and, more particularly, relates to a folder transfer method and system.

BACKGROUND

Instant Messaging (IM) technology is a terminal service technology, which enables two or more terminals to exchange text messages and document files in real-time through the network, and to realize voice or video interaction, etc.

Figure 1:
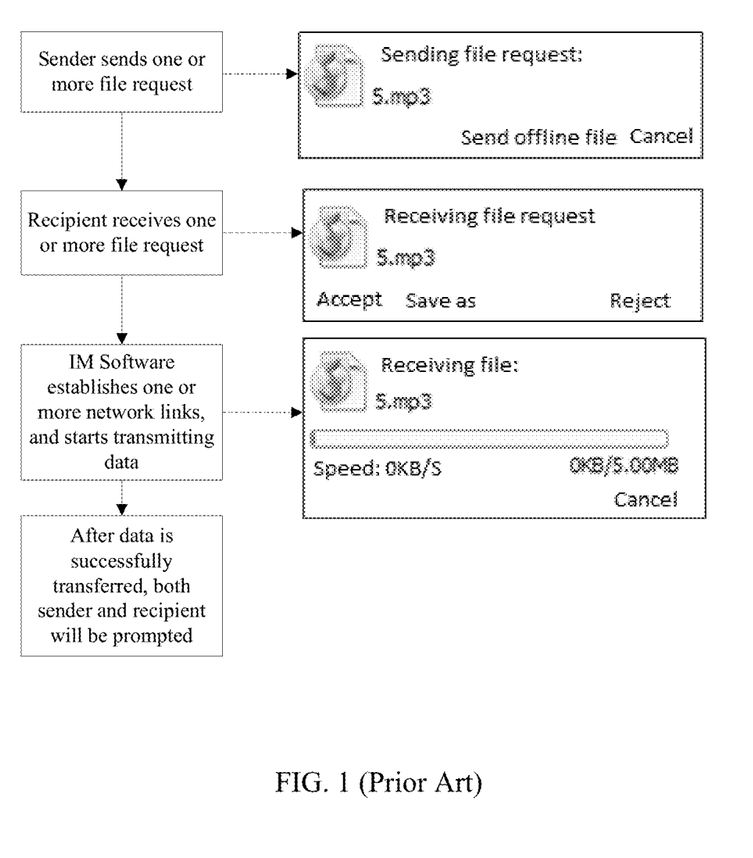
FIG. 1 shows an illustrative operation of the existing IM software to achieve the file transfer.

As IM software is being applied to more and more occasions and is used more and more frequently, users are no longer satisfied by communicating in the form of chat. The users want to use IM to share with other users of entertainment resources, learning materials, experimental data, and office documents, etc., that is, to realize the function of transferring files between the users (or simply called file transfer). In current IM software, file transfer operations are shown in FIG. 1.

When the recipient accepts the file transfer request, IM will establish one or more network connections used to transmit data in the file. However, individual files are often independent from each other, when transferring all files in a folder, both the sender and the recipient need to perform some complex and repetitive operations.

For example, the sender needs to select a file to be transmitted multiple times, or to select multiple files at the same time, or even to traverse all subdirectories to select files in each sub-directory of the folder when the folder has subdirectories. On the other hand, the recipient needs to repeatedly click the button for accepting the file, or to repeatedly specify the file storage path.

In addition, when transferring all files in a folder, the folder's original folder hierarchy and organizational structure cannot be directly reflected in the transferred files themselves. The sender and recipient need additional communication in order for the recipient to understand the original folder structure, and the recipient needs to perform file management operations before or after receiving the files (including creating a folder and modifying the file storage directory, etc.).

When users face the above scenarios, often the sender may first use WINRAR or other compression software to pack the files in the folder into a compressed package, and then send the compressed package to the recipient by a single file transfer. The recipient can finally uncompress the compressed package to obtain the original files. Although the compression and decompression operations can reduce the complexity of file transfer to a certain degree, such operations may still give users an undesired user experience.

The disclosed methods and systems are directed to solve one or more problems set forth above and other problems.

BRIEF SUMMARY OF THE DISCLOSURE

One aspect of the present disclosure includes a method for folder transfer based on instant messaging (IM). The method includes receiving from an IM sender a transfer request for transferring a folder-to-be-transferred. The folder-to-be-transferred may contain a plurality of files. The method also includes receiving from the IM sender folder information of the folder-to-be-transferred, determining a receiving folder corresponding to the folder-to-be-transferred on a predetermined storage location, and determining files-to-be-transferred from the plurality of files corresponding to the folder-to-be-transferred based on the folder information. Further, the method includes sequentially sending one transfer request for each of the files-to-be-transferred to the IM sender through a same network connection, receiving the files-to-be-transferred sent sequentially by the IM sender through the same network connection, and storing the received files-to-be-transferred in the receiving folder.

Another aspect of the present disclosure includes an instant messaging (IM) based folder transfer system. The folder transfer system includes a receiving module, a processing module, and a transmission module. The receiving module is configured to receive from an IM sender a transfer request for transferring a folder-to-be-transferred and to receive from the IM sender folder information of the folder-to-be-transferred. The folder-to-be-transferred may contain a plurality of files. Further, the processing module is coupled to the receiving module and is configured to determine a receiving folder corresponding to the folder-to-be-transferred on a predetermined storage location, and to determine files-to-be-transferred from the plurality of files and corresponding to the folder-to-be-transferred based on the folder information. The transmission module is coupled to the processing module and the receiving module and is configured to sequentially send one transfer request for each of the files-to-be-transferred to the IM sender through a same network connection, to receive the files-to-be-transferred sent sequentially by the IM sender through the same network connection, and to store the received files-to-be-transferred in the receiving folder.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 5:
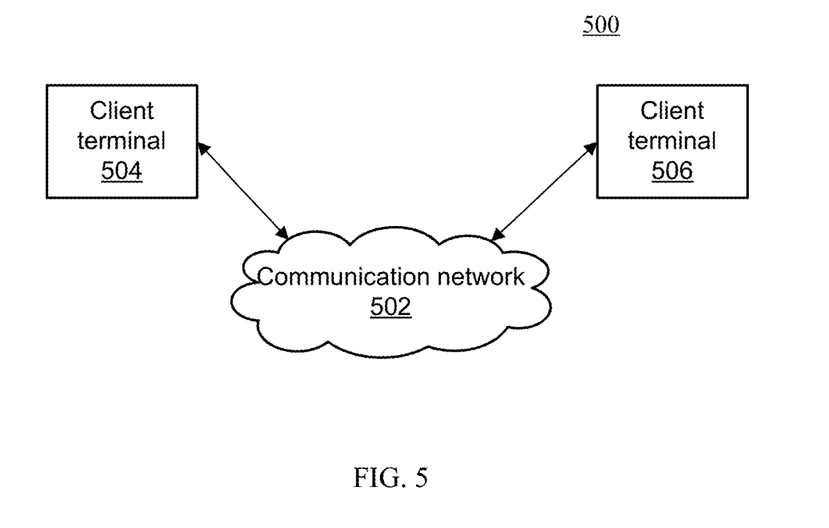
FIG. 5 illustrates an exemplary environment incorporating certain disclosed embodiments.

FIG. 5 illustrates an exemplary environment 500 incorporating certain disclosed embodiments of the present invention. As shown in FIG. 5, environment 500 may include a first client terminal 504, a second client terminal 506, and a communication network 502. The first client terminal 504 and the second client terminal 506 are coupled through the communication network 502 for information exchange. Although only two client terminals are shown in the environment 500, any number of terminals or other devices may be included.

A client terminal, as used herein, may refer to any appropriate user terminal with certain computing capabilities, such as a personal computer (PC), a work station computer, a server computer, a hand-held computing device (tablet), a smart phone or mobile phone, or any other user-side computing device.

A client terminal may also include certain components or devices to carry out various functionalities. For example, a client terminal may include a processor, memory modules such as ROM, RAM, and flash memory modules, storage medium such as CD-ROM, U-disk, removable hard disk, etc., I/O devices such as keyboard and mouse, network devices for establishing connections through the communication network 502, and database(s) for storing certain operational and system data. Other devices may also be included.

Communication network 502 may include any appropriate type of communication network for providing network connections to the client terminals 504 and 506. For example, communication network 502 may include the Internet or other type of computer network or telecommunication network, either wired or wireless.

Figure 2:
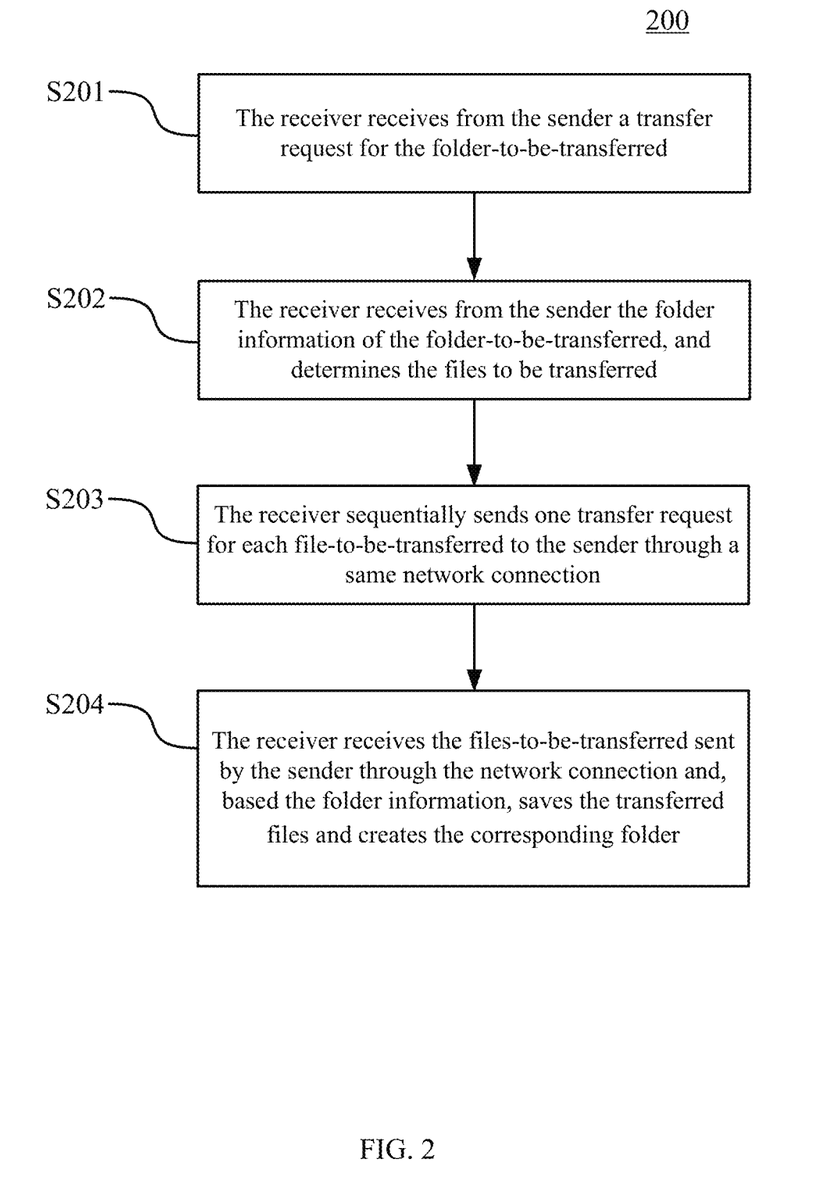
FIG. 2 illustrates an exemplary process for folder transfer consistent with the disclosed embodiments.

Client terminal 504 and client terminal 506 may exchange information between each other through the communication network 502 using certain software. For example, client terminal 504 and client terminal 506 may exchange information via software applications based on various network protocols, such as TCP/IP and HTTP, etc. More specifically, client terminal 504 and client terminal 506 may exchange information using instant messaging (IM) software to exchange files and folders. FIG. 2 illustrates an exemplary process 200 for transferring a file folder using IM software consistent with the disclosed embodiments.

When performing a folder transfer based on IM software, client terminal 504 and client terminal 506 may act as an IM sender (or simply sender) and an IM receiver (or simply receiver). A folder transfer via IM software (or an IM folder transfer), as used herein, may refer to an automatically transfer of all files and folder structures of the folder based on IM software. As shown in FIG. 2, at the beginning, the receiver receives from the sender a transfer request for the folder to be transferred (S201).

More specifically, the transfer request may include the folder identification information and folder size information. After the receiver receives the transfer request for the folder-to-be-transferred from the sender, the receiver may determine whether to accept the folder-to-be-transferred from the sender.

When the receiver receives an instruction agreeing to accept the folder-to-be-transferred, the receiver may further determine whether there is enough storage space to store the folder-to-be-transferred based on the folder size information. If there is not enough storage space, the receiver may prompt the user for changing the storage location. On the other hand, if there is enough storage space, the receiver sends a folder transfer confirmation back to the sender.

Further, the receiver receives from the sender the folder information of the folder-to-be-transferred and determines the files to be transferred (S202). More specifically, after the receiver receives from the sender the folder information of the folder-to-be-transferred, the receiver performs a checksum operation on the files locally available based on the folder information of the folder-to-be-transferred, and sends the checksum information to the sender.

The receiver receives from the sender a comparison result of the checksum information, and determines the files-to-be-transferred as those files not successfully checked. Afterwards, the receiver sequentially sends one transfer request for each file-to-be-transferred to the sender through a same network connection (S203).

For example, the receiver may first create a file-to-be-transferred list based on the files to be transferred. The file-to-be-transferred list may contain files to be transferred from the sender to the receiver, as well the order of files requested by the receiver to be sent by the sender. Based on the order of the files on the file-to-be-transferred list, the receiver sequentially sends a transfer request for each file-to-be-transferred to the sender.

Further, when the file-to-be-transferred is a folder, the receiver directly creates a corresponding folder locally; when the size of the file-to-be-transferred is 0, the receiver directly creates the file locally; and when the size of the file-to-be-transferred is not 0, the receiver sends the file transfer request for the file-to-be-transferred to the sender.

Further, the receiver receives the files-to-be-transferred sent sequentially by the sender through the network connection and, based the folder information, saves the transferred files, and creates the corresponding folder (S204). During file transfer, certain error may occur and the file transfer may fail. When the transfer failed for a file-to-be-transferred, the receiver receives the cause for failure from the sender and performs certain processing based on the cause for failure.

For example, when the failure is due to the file-to-be-transferred being temporarily used by others, the receiver may resend the transfer request to the sender for the file-to-be-transferred after a certain period of time such that the file can be resent by the sender. When the failure is due to the file-to-be-transferred being unable to be transmitted, the receiver may delete the file-to-be-transferred from the file-to-be-transferred list to avoid transferring the file again.

Further, after the receiver receives the files-to-be-transferred sequentially sent through the network connection and saves the files-to-be-transferred according to the folder information, the receiver may also perform certain post-transfer processing.

For example, the receiver may perform a security check on the received files and, if there is any security risk in a received file, the receiver may record the file with security risk, warn the security risk, and/or directly delete the received file with security risk.

As previously explained, the folder transfer may involve transferring all files in the folder-to-be-transferred. Under certain circumstances, the transmission of the folder-to-be-transferred is interrupted. The receiver and the sender may establish certain procedures to handle the folder transfer interruption.

For example, when the transmission of the folder-to-be-transferred is interrupted, the receiver may record the progress of the transmission of the folder-to-be-transferred. Later, when the sender requests to continue the transmission of the folder-to-be-transferred, the receiver checks the recorded transmission progress. If the receiver determines to continue the transmission, the unfinished transmission of the folder-to-be-transferred is continued based on the path before the interruption; if the receiver determines not to continue the transmission, the folder-to-be-transferred is transmitted according to a new storage path. Further, the receiver may delete the recorded transmission progress of the folder-to-be-transferred after the folder transfer begins.

Figure 4:
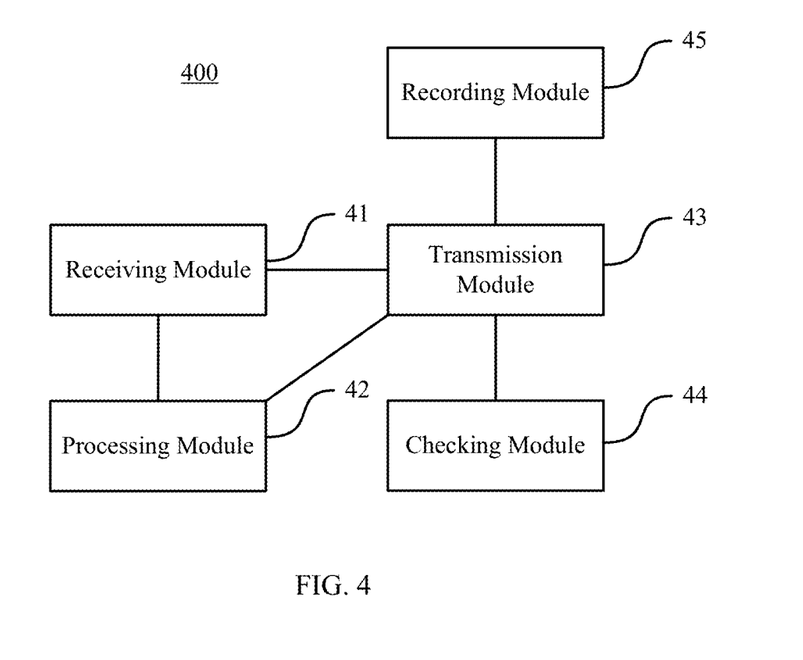
FIG. 4 illustrates a structural diagram of a folder transfer system consistent with the disclosed embodiments.

In certain embodiments, client terminal 504 and/or client terminal 506 (the IM receiver and/or the IM sender) may be configured to include various functionalities to perform the process 200. More particularly, client terminal 504 and/or client terminal 506 may contain at least one processor (e.g., a microprocessor, controller, CPU, etc.) to implement various functional modules to perform the process 200. FIG. 4 illustrates a functional block diagram of an exemplary client terminal 400 (e.g., client terminal 504 and/or client terminal 506) consistent with the disclosed embodiments.

As shown in FIG. 4, client terminal 400 may include a receiving module 41, a processing module 42, a transmission module 43, a checking module 44, and a recording module 45. Certain module(s) may be omitted and other modules may be added. Further, the various modules may be implemented in software (e.g., IM software), hardware, or a combination of software and hardware.

The receiving module 41, the processing module 42, and the transmission module 43 may be coupled to each other to perform receiving function, processing function, and transmission function of the client terminal 400. Further, the recording module 45 and the checking module 44 are coupled to the transmission module 43 to perform certain recording function and checking function, respectively. Other configurations may also be used.

To complete a folder transfer operation, these various modules may be configured to perform certain tasks. The details of the functions and/or tasks performed by the various modules are further explained below together with FIG. 3, which illustrates an exemplary folder transfer process 300 in detail consistent with the disclosed embodiments.

Figure 3:
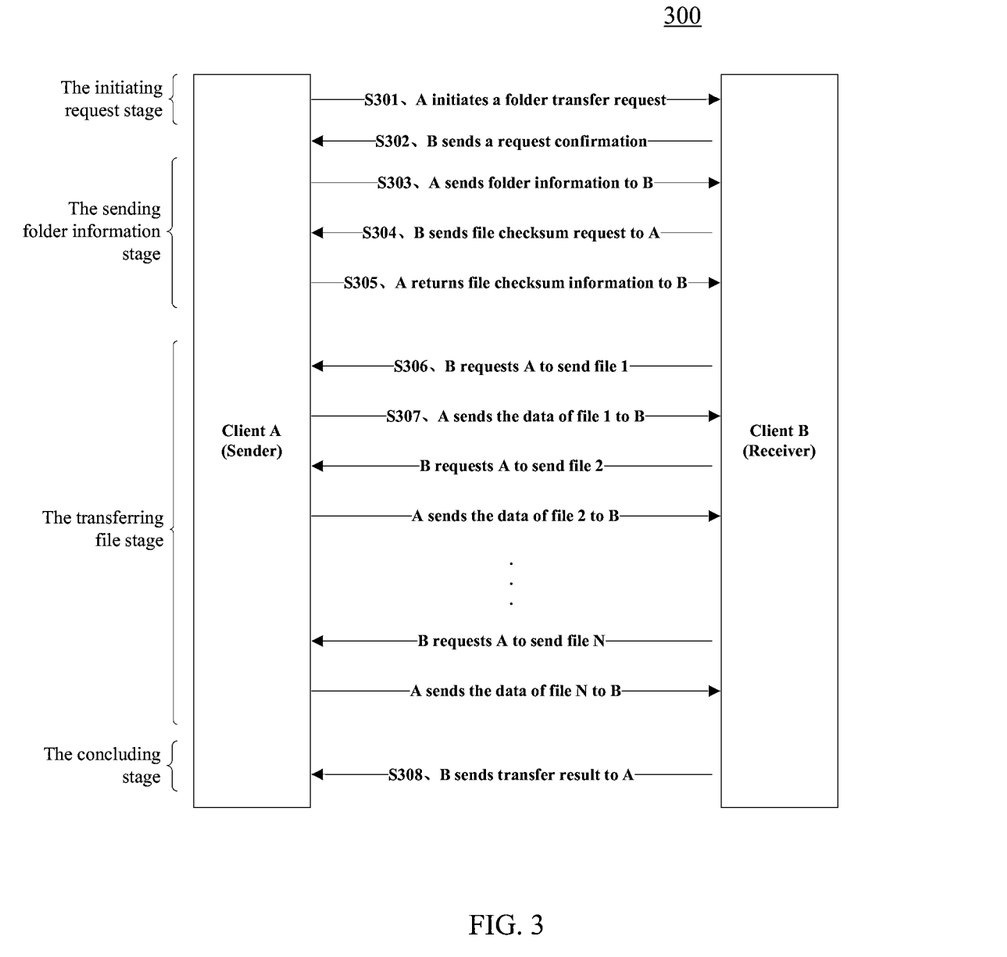
FIG. 3 illustrates an exemplary process for folder transfer in detail consistent with the disclosed embodiments.

As shown in FIG. 3, client terminals "client A" and "client B" (e.g., client terminal 504 and client terminal 506) may be involved in the folder transfer process 300. The client A and client B may be implemented with client terminal 400 and use various modules to complete the folder transfer process 300.

Further, as shown in FIG. 3, the folder transfer may include four stages, stages 1-4. Stage 1 may be an initiating request stage; stage 2 may be a sending folder information stage; stage 3 may be a transferring file stage, and stage 4 may be a concluding stage. These four stages may respectively complete different tasks during the folder transfer process.

Stage 1: the Sending Request Stage

At the beginning, client A (an IM sender) initiates a folder transfer request to client B (S301). For example, the transmission module 43 of client A may send the folder-transfer request to client B, and the receiving module 41 of client B may receive the folder-transfer request. The request may include the identifier of the folder-to-be-transferred and the total size of the folder. The folder-to-be-transferred may contain multiple files (e.g., simple files, sub-folders).

After receiving module 41 of client B receives the folder transfer request, processing module 42 of client B may first determine whether to accept the folder-to-be-transferred based on the transfer request. For example, the processing module 42 may prompt a user of client B for permission or may process automatically based on preconfigured settings. If the folder-to-transferred is not accepted, client B may refuse the transfer request.

On the other hand, if the folder-to-transferred is accepted, client B (e.g., processing module 42) may check the received folder-transfer request and determine whether there is enough storage space in a designated disk location for storing the folder based on the size information in the folder-transfer request. If there is not enough storage space, the client B will choose another storage location. For example, processing module 42 may prompt a user for designating a new storage location or may use a preset storage location. Until the client B chooses a disk location with enough storage space to store the folder, the folder transfer process does not enter the next stage.

Further, after client B ensures there is enough storage space for storing the folder-to-be-transferred, processing module 42 of the client B may send a request confirmation message to client A via transmission module 43 (S302). Afterwards, the folder transfer process 300 goes to the next stage (stage 2).

Additionally or optionally, client A may also perform a version-compatibility operation before sending out the folder-transfer request. That is, the client A may check the version in the client B before sending out the folder-transfer request. For example, client A may send a version check request to client B to obtain the version of client B. If the client A is able to obtain the version in the client B, and the version in client B supports the folder transfer, the client A sends out the folder-transfer request.

If the client A is able to obtain the version in the client B, but the version in client B does not support the folder transfer, the client A does not send out the folder-transfer request. In addition, the client A informs the client B that the version is too low to support the folder transfer.

If the client A is temporarily unable to obtain the version in the client B (for example, the client B is an invisible or offline state), the client A may still send out the folder-transfer request. Because the folder-transfer uses a new protocol, older versions that do not support the folder transfer cannot recognize the new protocol and, thus, do not react to the data of the new protocol. Therefore, the disclosed folder-transfer will not cause abnormal behavior in the older versions, while new versions supporting the folder transfer can operate according to the normal logic. Further, if the client A is unable to obtain the version in the client B, the client A may inform the user that the receiving party may be unable to receive the folder when sending out the folder transfer request.

Stage 2: the Sending Folder Information Stage

After receiving the request confirmation message from client B, the client A may send folder information to client B (S303). The folder information may contain the folder's directory structure information, the identifier, name, and attributes of each folder or file, and the file size for each file, etc. Other folder information may also be included.

Based on the directory structure information, the client B can ensure that the folder transmitted to the client B can maintain the same directory structure as that in client A. The attribute information of each file (folder) can be used by both the client A and client B to keep the attributes of the file (folder) consistent. The identifier of each file (folder) can be used by both the sending side and receiving side for uniquely identifying a file (folder) between them so as to facilitate the interaction between both sides.

Further, the folder's directory structure information may be represented in any appropriate ways recognized by both client A and client B. For example, client A may encode the tree structure of the folder-to-be-transferred and sends the encoded data to the client B.

The coding method may include binary coding and a variety of text formats (including XML), etc. Any appropriate format, as long as both client sides agree, can be used in the disclosed technical solution. The transmission method may include using temporary files and directly transmitting data in memory, etc. Similarly, any appropriate transmission means, as long as both client sides agree, can be used.

In certain embodiments, the client A (e.g., IM software on client A) may encode the folder structure using binary coding and stores the encoded data in a temporary file, which is then sent to the other side using any appropriate file transfer means.

The receiving module 41 of client B may receive the folder information from client A, and the client B (e.g., processing module 42) may interpret the folder information sent from the client A, calculate checksum information of files available locally, and send the checksum information and a checksum request to client A (S304).

For example, client B may determine a receiving folder using the previously determined user-specified storage location or preconfigured storage location and may check whether any file is available locally in the receiving folder. For all the files locally available, a checksum or other signature may be calculated for each file. Then, the client B may send the calculated results to the client A and further requests the client A to perform checksum or verification at the sender-side.

The receiving module 41 of client A receives the checksum information from client B, and processing module 42 the client A compares the checksum sent from the client B with the checksum information of the local files, and sends the comparison result back to the client B (S305).

The processing module 42 of client B receives the checksum comparison result from the client A, and processing module 42 of client B further analyzes the checksum result to determine files to be transferred from the client A. Those files successfully checked or verified do not need to be re-transmitted, and those files unsuccessfully checked or without checksum result are determined as the files need to be transmitted, i.e., files-to-be-transferred.

Thus, by checking the local files on the client B, repetitive transmission of previous successfully-transmitted files or of files that client B already has may be avoided. Folder transfer resuming from broken points may be achieved and the efficiency and ease of use of the folder transfer may be improved. Further, those files with failed checksum may be retransmitted to avoid that a file failed from the last transmission is ignored in the current transmission.

Further, client A and client B may use any appropriate file verification or checksum techniques. Commonly used checksum methods include but not limited to CRC32 and MD5, etc. Any technique that can verify the integrity of the file to certain extent can be used in the disclosed technical solution. In certain embodiments, client A and client B (e.g., the IM software on client A and client B) may use MD5 as the file verification or checksum method.

After completion of the above interactions and steps, next stage (i.e., the stage of transferring file) is entered.

Stage 3: the Transferring File Stage

After the processing module 42 of client B receives the checksum comparison result and determines the files-to-be-transferred, the transmission module 43 of the client B sends a file transfer request for each file to the client A in sequence (S306). More particularly, the transmission module 43 may first traverse the folder information and create and maintain a file-to-be-transferred list. The file-to-be-transfer list may contain files to be requested for transfer from client A as well as an order for requesting the transfer. Other information may also be included in the file-to-be-transferred list.

The file-to-be-transferred list maintained by the client B may derived from the folder information sent from the client A to the client B in the previous stage. The successfully checked files in the previous stage will not be included in this list. However, all folders included in the folder information will be included in this list.

Before sending any file transfer request, the transmission module 43 of client B may first pre-process the entries on this list. The client B may determine whether a file of the files-to-be-transferred is folder or has a size of 0. If the entry is a file folder, the client B directly creates a folder locally; if the entry is a file with a size of 0 byte, the client B directly creates the file locally without initiating a request to the client A. For other entries, the client B requests the client A to transmit the file.

Based on the file-to-be-transferred list, the transmission module 43 of client B sends file transfer requests to the client A in sequence and waits for the data from the client A. More specifically, based on the order of the files on the file-to-be-transferred list, the transmission module 43 of client B sequentially sends one transfer request for each file-to-be-transferred to the client A through a same network connection.

The client A does not initiate data transmission of each file to the client B. Rather, the client A waits for the file transfer request sent from the client B to the client A. After receiving module 41 of client A receives the file transfer requests from client B, the client A may start sending the data of each file to the client B in sequence (S307).

More particularly, after receiving the file transfer request from the client B, the client A determines whether the file can be transmitted. If the client A determines that the file can be sent, the client A may immediately start transmitting the data of the file after receiving the file transfer request.

On the other hand, if the file cannot be sent, the client A will directly inform the client B that the file cannot be sent, together with the cause why the file cannot be sent. The cause for failure may include:

(A) the file on the client A's disk has been accidentally deleted or fails to be read due to disk error or other reasons;

(B) the file on the client A's disk is currently used by other software, and is temporarily unable to be transmitted; and (C) the file size exceeds a certain value, while the other side's IM software has a version that is too low to support transfer of such a large file, etc.

After client A sends the data of each file requested, the transmission module 42 of client B may receive the files-to-be-transferred sent sequentially by the sender through the network connection and, based the folder information, saves or stores the transferred files and creates the corresponding folders or sub-folders.

If, after sending out the file transfer request, the client B receives the message from the client A informing that the file cannot be sent, transmission module 43 of the client B may perform certain processing based on the cause of failure contained in the message.

When the failure is due to the file-to-be-transferred being temporarily used by others, the transmission module 43 of client B may move the file from the top of the file-to-be-transferred list downwards, and may resend the transfer request to the sender for the file-to-be-transferred after a certain period of time. When the failure is due to the file-to-be-transferred being unable to be transmitted, the transmission module 43 of client B may remove the file-to-be-transferred from the file-to-be-transferred list, and may continue to request the next file from the client A.

After one file transfer is completed, the client B may remove the file from the file-to-be-transferred list. Further, client B may determine whether there is any file on the file-to-be-transferred list. If there is any remaining file on the file-to-be-transferred list, transmission module 43 of client B continues sending to the client A a transfer request for the next file.

On the other hand, if the file-to-be-transferred list is empty, client B may determine that all files are requested, and the process may enter the next stage (i.e., the concluding stage). Because the file transfer request for each file and the data for file requested are transmitted in a same network connection, transfer efficiency and user experience may be further improved.

Additionally or optionally, checking module 44 of client B may perform a security check on the files completely transferred and received by client B. The checking module 44 of client B may also record the files with security risks, warn the user about the files with security risks, and/or delete the files with security risk.

Further, during the file transfer for files in the folder-to-be-transferred, the folder transfer may be interrupted during the transmission for a variety of reasons. For example, the user may click the "cancel" button" to cancel sending or receiving, the network connection may be interrupted, and/or the user may be off-line, etc. When the folder transfer is interrupted, the client B may record certain information of the interrupted folder.

More specifically, recording module 45 of the client B may record the progress of the transmission of the folder transfer when the transmission is interrupted. The recorded progress information may include the sender information, the name of the folder, the path storing the folder, the total size of the folder and the size of the folder that has been transferred, etc. The progress information may be stored in memory and/or may be stored as a temporary file in the client B's disk.

The interrupted transmission of the folder transfer may be resumed. For example, when client A resends the folder transfer request to resume the folder transfer, the client B may first check the recorded progress information. If the folder was previously transferred, the client B may prompt the user that the folder transfer can be resumed and may show the size that has been transmitted successfully. Client B may then determine whether to continue or resume the transmission. If the client B chooses to resume based on a user input or configuration, the previous folder storage path is used to continue the folder transfer.

On the other hand, if the client B chooses not to resume, the user is requested to select a path for storing the folder and a new folder transfer starts. After the resumed or new transfer starts, the progress information of the folder transfer is deleted. If a folder transfer is completed successfully, the client B does not record any resuming information for the transferred folder.

In addition, progress information may also be recorded for a file transfer by recording module 45 of the client B when the file transfer is interrupted such that the file transfer may be later resumed from the broken point. Optionally, the file transfer progress information may be included in the folder transfer progress information such that the entire folder transfer including the file transfer can be resumed from interruption.

Further, during the folder transfer process, files in the folder-to-be-transferred on client A may change. Client A may determine characteristics of such change and perform corresponding operations. For example, if a file changes after the file has been transferred, client A does not perform any further processing. If a file is changed by external software forcefully during the transmission process, file read error may be caused by the change, which may further lead to abnormal abortion of the file transfer. Client A may send a cause of failure to client B.

Further, if a file is modified before the transmission, client A uses the modified data in transmission. If a file is deleted before the transmission, when the client B requests the file, client A may inform client B that the file is deleted. In addition, if a file is newly added to the folder after the client A sends the folder information to the client B, the client B does not request the file and client A does not perform any further processing. Other changes may also be included.

Stage 4: the Concluding Stage

After all the files are transferred and/or received, the client B may send a folder transfer result to the client A (S308). For example, after receiving all transferred files in the folder-to-be-transferred, the client B may generate the folder-transfer result and may send the folder-transfer result to the client A. If there are some files failed the transfer, the folder transfer result includes a list of these failed files and the cause of failure recorded in the previous stage. If all the files are transferred successfully, both the client A and the client B may inform the respective users that the folder sending and folder receiving are successful. Otherwise, the client A and the client B will inform the users that some files failed the sending or receiving, and also inform the users which files failed the sending or receiving and the corresponding cause of failure. Thus, at this point, the folder transfer process completes.

Those skilled in the art can also understand that the modules in certain embodiments may be arranged in a single system or may be arranged in different systems. Further, the modules in certain embodiments may be combined into a single module or may be further separated into several sub-modules.

By applying the disclosed technical solution according to the embodiments of the present invention, a user is allowed to send a folder to other user(s) as a single entity by only using simple operations similar to those of a single file transfer. The user does not need to send files repeatedly, to create a compressed package, or to uncompress the compressed package, etc. The user also does not need to use additional communication with the receiver of the file transfer to inform the receiver the directory structure of the folder-to-be-transferred. Thus, the disclosed folder transfer can substantially satisfy the user's demand for convenience, improve the ease of use of file transfer, and enhance the practicability of the IM software. Other applications, advantages, alternations, modifications, or equivalents to the disclosed embodiments are obvious to those skilled in the art.

What is claimed is:

1. A method for folder transfer based on instant messaging (IM), comprising:
    performing, by an IM sender, a version-compatibility check with an IM receiver;
    receiving, by the IM receiver, from the IM sender a transfer request for transferring a folder-to-be-transferred, wherein the folder-to-be-transferred contains a plurality of files;
    receiving from the IM sender folder information of the folder-to-be-transferred;
    determining a receiving folder corresponding to the folder-to-be-transferred on a predetermined storage location;
    determining files-to-be-transferred from the plurality of files corresponding to the folder-to-be-transferred based on the folder information;
    sequentially sending one transfer request for each of the files-to-be-transferred to the IM sender through a same network connection;
    receiving the files-to-be-transferred sent sequentially by the IM sender through the same network connection; and
    storing the received files-to-be-transferred in the receiving folder;
    wherein, performing, by the IM sender, a version check with the IM receiver further includes:

when the version of the IM receiver supports folder transfer, sending, by the IM sender, the folder-transfer request;

when the version of the IM receiver does not support folder transfer, informing, by the IM sender, the IM receiver that the version is too low to support the folder transfer and stopping sending the folder-transfer request; and when the IM sender is unable to obtain the version of the IM receiver, sending, by the IM sender, the folder-transfer request.

2. The method according to claim 1, wherein:

the transfer request from the IM sender for transferring a folder-to-be-transferred includes folder-identification information and folder size information; and after receiving the transfer request, the method further includes:

when receiving an instruction agreeing to accept the folder-to-be-transferred, determining whether there is enough storage space to store the folder-to-be-transferred in the predetermined storage location based on the folder size information;

when it is determined that there is not enough storage space, prompting for changing the storage location; and when it is determined that there is enough storage space, sending a folder transfer confirmation to the IM sender.

3. The method according to claim 2, wherein after sending a folder transfer confirmation to the IM sender, further includes:

receiving folder information from the IM sender, the folder information including directory structure information, attribute information of each file and each folder, folder identification information for each file and each folder and size information of each file and each folder;

wherein the folder identification information are used by both the IM sender and the IM receiver for uniquely identifying one of a file and a folder.

4. The method according to claim 1, wherein sequentially sending one transfer request for each of the files-to-be-transferred further includes:

creating a file-to-be-transferred list based on the files-to-be-transferred including an order of files to be transferred;

determining whether a file of the files-to-be-transferred is folder or has a size of 0;

when it is determined that the file is a folder, directly creating a corresponding folder locally without sending any file transfer request;

when it is determined the file has a size of 0, directly creating the file locally without sending any file transfer request; and based on the order of files on the file-to-be-transferred list, sequentially sending one transfer request for each file-to-be-transferred to the IM sender.

5. The method according to claim 4, wherein receiving the files-to-be-transferred sent sequentially by the IM sender further include:

receiving a cause for failure from the IM sender with respect to a failed transfer for a file-to-be-transferred;

when the failure is due to the file-to-be-transferred being temporarily used by other software, moving the file from the top of the file-to-be-transferred list downwards and resending the transfer request for the file-to-be-transferred to the IM sender after a certain period of time; and when the failure is due to the file-to-be-transferred being unable to be transmitted, deleting the file-to-be-transferred from the file-to-be-transferred list.

6. The method according to claim 1, wherein determining files-to-be-transferred further includes:

performing checksum on files locally available based on the folder information of the folder-to-be-transferred to generate checksum information;

sending the checksum information to the IM sender;

receiving from the IM sender a comparison result of the checksum information reflecting whether a file in the folder-to-be-transferred is checked successfully; and determining the files-to-be-transferred as those files not successfully checked based on the comparison result.

7. The method according to claim 1, further including:

performing a security check on received files; and when one or more files have security risk, recording the files with security risk, warning a user of the security risk, and deleting the files with security risk.

8. The method according to claim 1, further including:

when transmission of the folder-to-be-transferred is interrupted, recording progress information of the transmission;

when the IM sender requests to continue the transmission of the folder-to-be-transferred, checking the recorded progress information;

determining whether to continue the transmission;

when it is determined to continue the transmission, resuming the unfinished transmission of the folder-to-be-transferred based on a storage path before the interruption; and when the continued transmission begins, deleting the recorded progress information of the folder-to-be-transferred.

9. The method according to claim 1, after storing the received files-to-be-transferred in the receiving folder, further includes:

generating and sending a folder transfer result to the IM sender after all the files are transferred, wherein when some files failed the transfer, the folder transfer result includes a list of the failed files and the cause of failure.

10. The method according to claim 1, wherein sequentially sending one transfer request for each of the files-to-be-transferred to the IM sender through a same network connection further includes:

when a file in the folder-to-be transferred is modified after the file has been transferred, performing no further processing;

when a file in the folder-to-be transferred is modified by external software forcefully during the transmission process, sending a cause of failure to the IM receiver;

when a file in the folder-to-be transferred is modified before the file transfer, sending the modified file to the IM receiver;

when a file in the folder-to-be transferred is deleted before the file transfer, informing the IM receiver that the file is deleted; and when a file is newly added to the folder after sending the folder information to the IM receiver, performing no further processing.

11. An instant messaging (IM) based folder transfer system, comprising:

a sending module configured to:

perform, by an IM sender, a version-compatibility check with an IM receiver;

a receiving module configured to:

receive from the IM sender a transfer request for transferring a folder-to-be-transferred, wherein the folder-to-be-transferred contains a plurality of files; and receive from the IM sender folder information of the folder-to-be-transferred;
a processing module coupled to the receiving module and configured to:
determine a receiving folder corresponding to the folder-to-be-transferred on a predetermined storage location; and
determine files-to-be-transferred from the plurality of files and corresponding to the folder-to-be-transferred based on the folder information; and
a transmission module coupled to the processing module and the receiving module and configured to:
sequentially send one transfer request for each of the files-to-be-transferred to the IM sender through a same network connection;
receive the files-to-be-transferred sent sequentially by the IM sender through the same network connection;
store the received files-to-be-transferred in the receiving folder;
wherein, when performing a version check with an IM receiver, the sending module is further configured to:
when the version of the IM receiver supports folder transfer, sending, by the IM sender, the folder-transfer request;
when the version of the IM receiver does not support folder transfer, informing, by the IM sender, the IM receiver that the version is too low to support the folder transfer and stopping sending the folder-transfer request; and
when the IM sender is unable to obtain the version of the IM receiver, sending, by the IM sender, the folder-transfer request.

12. The folder transfer system according to claim 11, wherein, to sequentially send one transfer request for each of the files-to-be-transferred, the transmission module is further configured to:
create a file-to-be-transferred list based on the files-to-be-transferred including an order of files to be transferred;
determine whether a file of the files-to-be-transferred is folder or has a size of 0;
when it is determined that the file is a folder, directly create a corresponding folder locally without sending any file transfer request;
when it is determined the file has a size of 0, directly create the file locally without sending any file transfer request; and
based on the order of files on the file-to-be-transferred list, sequentially send one transfer request for each file-to-be-transferred to the IM sender.

13. The folder transfer system according to claim 12, wherein, to receive the files-to-be-transferred sent sequentially by the IM sender, the transmission module is further configured to:
receive a cause for failure from the IM sender with respect to a failed transfer for a file-to-be-transferred;
when the failure is due to the file-to-be-transferred being temporarily used by other software, move the file from the top of the file-to-be-transferred list downwards and resend the transfer request for the file-to-be-transferred to the IM sender after a certain period of time; and
when the failure is due to the file-to-be-transferred being unable to be transmitted, delete the file-to-be-transferred from the file-to-be-transferred list.

14. The folder transfer system according to claim 11, wherein:
the transfer request from the IM sender for transferring a folder-to-be-transferred includes folder identification information and folder size information; and
the processing module is further configured to:
when the receiving module receives an instruction agreeing to accept the folder-to-be-transferred, determine whether there is enough storage space to store the folder-to-be-transferred in the predetermined storage location based on the folder size information;
when it is determined that there is not enough storage space, prompt for changing the storage location; and
when it is determined that there is enough storage space, send a folder transfer confirmation to the IM sender.

15. The folder transfer system according to claim 11, wherein, to determine the files-to-be-transferred, the processing module is further configured to:
perform checksum on files locally available based on the folder information of the folder-to-be-transferred to generate checksum information;
send the checksum information to the IM sender;
receive from the IM sender a comparison result of the checksum information reflecting whether a file in the folder-to-be-transferred is checked successfully; and
determine the files-to-be-transferred as those files not successfully checked based on the comparison result.

16. The folder transfer system according to claim 11, further including:
a checking module configured to:
perform a security check on received files; and
when one or more files have security risk, recording the files with security risk, warning a user of the security risk, and deleting the files with security risk.

17. The folder transfer system according to claim 11, further including:
a recording module configured to:
when transmission of the folder-to-be-transferred is interrupted, record progress information of the transmission;
when the sender requests to continue the transmission of the folder-to-be-transferred, check the recorded progress information;
determine whether to continue the transmission;
when it is determined to continue the transmission, resume the unfinished transmission of the folder-to-be-transferred based on a storage path before the interruption; and
when the continued transmission begins, delete the recorded progress information of the folder-to-be-transferred.

* * * * *